(12) United States Patent
Namiki et al.

(10) Patent No.: US 10,687,625 B2
(45) Date of Patent: Jun. 23, 2020

(54) METHOD AND DEVICE FOR MANUFACTURE OF SEAT FOR VEHICLE

(71) Applicant: TACHI-S CO., LTD., Akishima-shi, Tokyo (JP)

(72) Inventors: Masami Namiki, Tokyo (JP); Ryuji Yonekura, Tokyo (JP); Tetsuya Murakami, Tokyo (JP)

(73) Assignee: TACHI-S CO., LTD., Tokyo (JP)

( * ) Notice: Subject to any disclaimer, the term of this patent is extended or adjusted under 35 U.S.C. 154(b) by 518 days.

(21) Appl. No.: 15/505,091

(22) PCT Filed: Jun. 30, 2015

(86) PCT No.: PCT/JP2015/068860
§ 371 (c)(1),
(2) Date: Feb. 19, 2017

(87) PCT Pub. No.: WO2016/027567
PCT Pub. Date: Feb. 25, 2016

(65) Prior Publication Data
US 2019/0150618 A1    May 23, 2019

(30) Foreign Application Priority Data
Aug. 21, 2014   (JP) ................... 2014-168616

(51) Int. Cl.
| | | |
|---|---|---|
| B23K 103/04 | (2006.01) | |
| A47C 1/024 | (2006.01) | |
| B60N 2/22 | (2006.01) | |
| B60N 2/225 | (2006.01) | |
| B60N 2/90 | (2018.01) | |
| B23K 31/02 | (2006.01) | |

(Continued)

(52) U.S. Cl.
CPC .............. *A47C 1/024* (2013.01); *B21D 53/88* (2013.01); *B23K 31/02* (2013.01); *B23K 37/047* (2013.01); *B23K 37/0443* (2013.01); *B23Q 3/06* (2013.01); *B60N 2/22* (2013.01); *B60N 2/2255* (2013.01); *B60N 2/90* (2018.02); *B23K 2101/006* (2018.08); *B23K 2103/04* (2018.08)

(58) Field of Classification Search
CPC .. A47C 1/024; B23K 37/047; B23K 37/0443; B23K 31/02; B23K 2103/04; B21D 53/88; B23Q 3/06; B60N 2/22; B60N 2/90; B60N 2/2255
See application file for complete search history.

(56) References Cited

U.S. PATENT DOCUMENTS

| | | | | |
|---|---|---|---|---|
| 7,458,298 B2 * | 12/2008 | Kliskey | ............... | F16D 65/0043 29/225 |
| 2015/0115550 A1 * | 4/2015 | Schenk | ................. | B23B 31/123 279/60 |

FOREIGN PATENT DOCUMENTS

| | | | | |
|---|---|---|---|---|
| DE | 102013111731 A1 * | 4/2015 | ........... | B23B 31/123 |
| JP | 2012-126244 A | 7/2012 | | |

OTHER PUBLICATIONS

International Search Report from International Patent Application No. PCT/JP2015/068860, dated Sep. 8, 2015.

* cited by examiner

*Primary Examiner* — Lee A Holly
(74) *Attorney, Agent, or Firm* — SGPatents PLLC

(57) ABSTRACT

Provided is a method for manufacture of a seat for a vehicle, comprising a step of setting a return spring in a clamp jig, a step of clamping and fixing the return spring in the clamp jig, a step of inserting the return spring which is clamped in the clamp jig in an attachment unit, and a step of removing the return spring from the clamp jig.

4 Claims, 15 Drawing Sheets

(51) Int. Cl.
*B21D 53/88* (2006.01)
*B23K 37/04* (2006.01)
*B23K 37/047* (2006.01)
*B23Q 3/06* (2006.01)
*B23K 101/00* (2006.01)

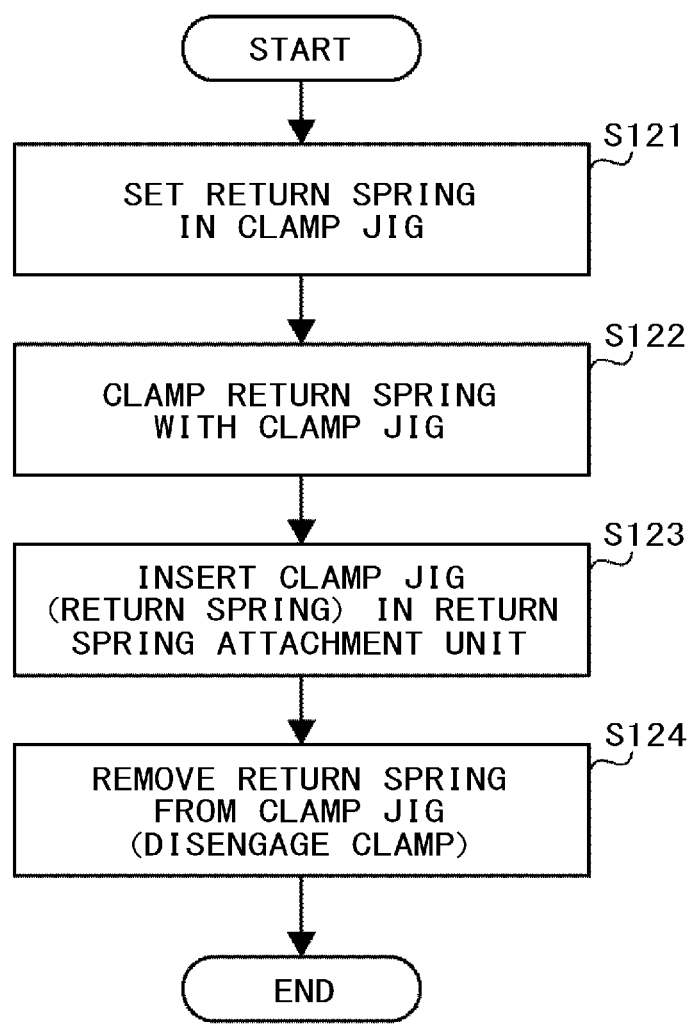

METHOD AND DEVICE FOR MANUFACTURE OF SEAT FOR VEHICLE

INCORPORATION BY REFERENCE

The present application claims priority from Japanese patent application JP2014-168616 filed on Aug. 21, 2014, the content of which is hereby incorporated by reference into this application.

TECHNICAL FIELD

The disclosure relates to a vehicle seat, which is applicable to, for example, the vehicle seat with reclining mechanism.

BACKGROUND ART

The vehicle seat with reclining mechanism has a back frame constituting the seatback tiltably linked to the seat cushion frame constituting the seat cushion. A lock device is connected between the seat cushion frame and the back frame, which is capable of regulating rotation of the seatback so as to arbitrarily adjust and set the tilt angle of the seatback. The lock device provided with a lever for releasing the lock state receives urging force applied from the return spring wound around the base end of the lever so that the lock device is brought into the locked state (for example, see Japanese Patent Application Laid-Open No. 2012-126244).

CITATION LIST

Patent Literature

PTL 1: Japanese Patent Application Laid-Open No. 2012-126244

SUMMARY OF INVENTION

Technical Problem

It is an object of the present invention to provide a method for manufacture of vehicle seat to which the return spring can be easily attached, and the device for manufacture of vehicle seat employed for implementation of the method.

Any other problems and novel features will be clarified by description of the disclosure and the accompanying drawings.

Solution to Problem

The representative disclosure may be summarized as below.

That is, with the method for manufacture of the vehicle seat, the return spring is attached by means of the force application device equipped with the clamp jig.

Advantageous Effects of Invention

The method for manufacture of vehicle seat ensures easy attachment of the return spring.

BRIEF DESCRIPTION OF DRAWINGS

FIG. 9 is a flowchart explaining a method for attachment of a return spring for the vehicle seat according to the embodiment.

DESCRIPTION OF EMBODIMENT

Figure 1:
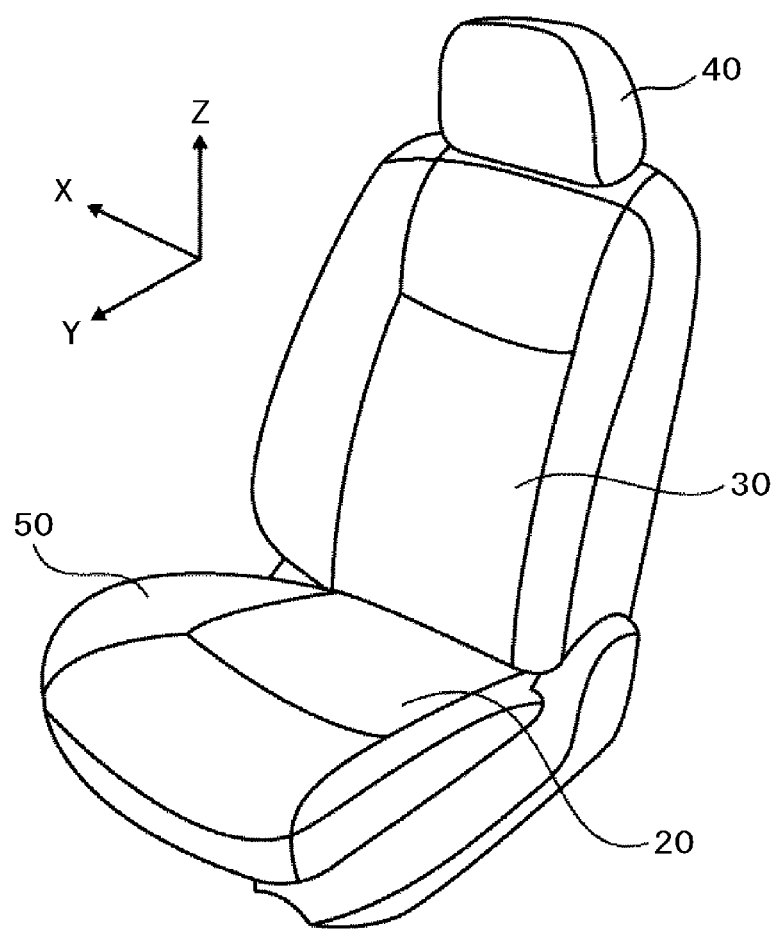
FIG. 1 is a perspective view of a vehicle seat according to an embodiment.

An embodiment will be described referring to the drawings. In the following description, the same components are designated with the same codes, and repetitive explanations thereof, thus will be omitted. The drawing may be schematically expressed with respect to the width, thickness, shape and the like of each component in comparison with the actual state. Such drawing represents a mere example, which is not intended to limit interpretation of the present invention.

<Structure>

The vehicle seat structure according to the embodiment will be described referring to FIGS. 1 to 5.

Figure 2:
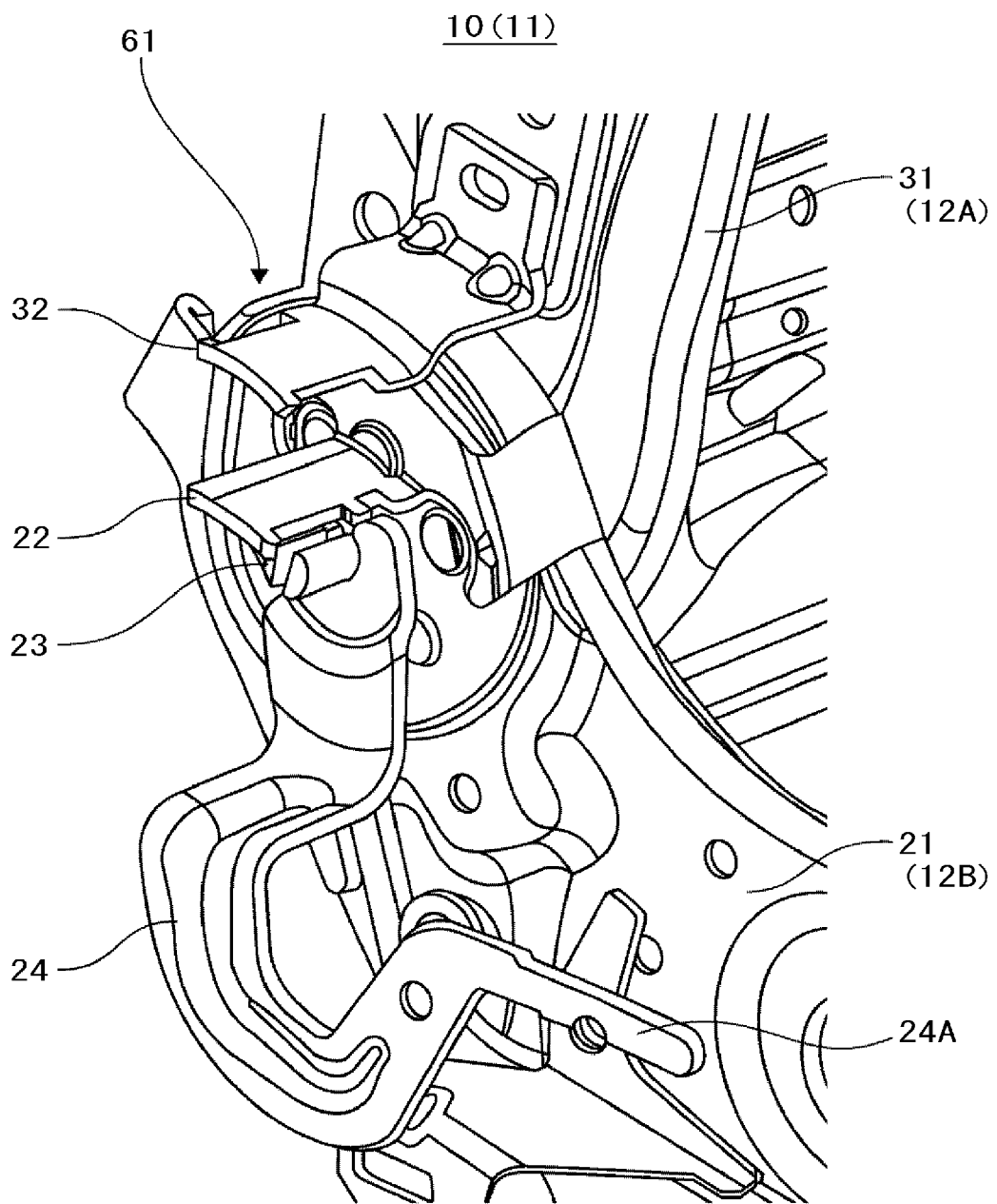
FIG. 2 is a perspective view of a principal part of the vehicle seat according to the embodiment.
Figure 3:
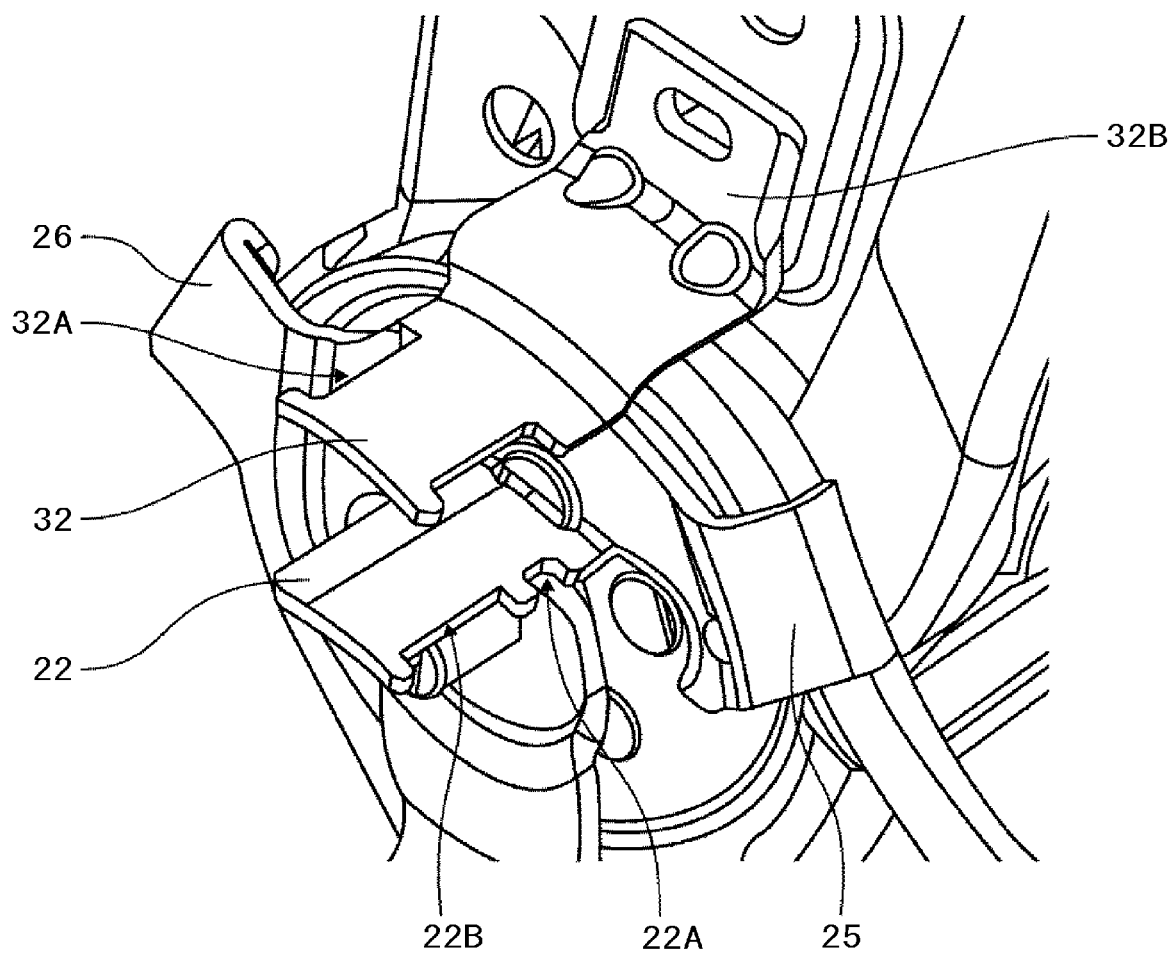
FIG. 3 is an enlarged view of FIG. 2.
Figure 3:
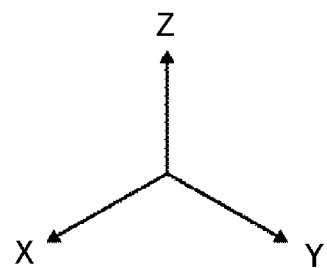
Figure 4:
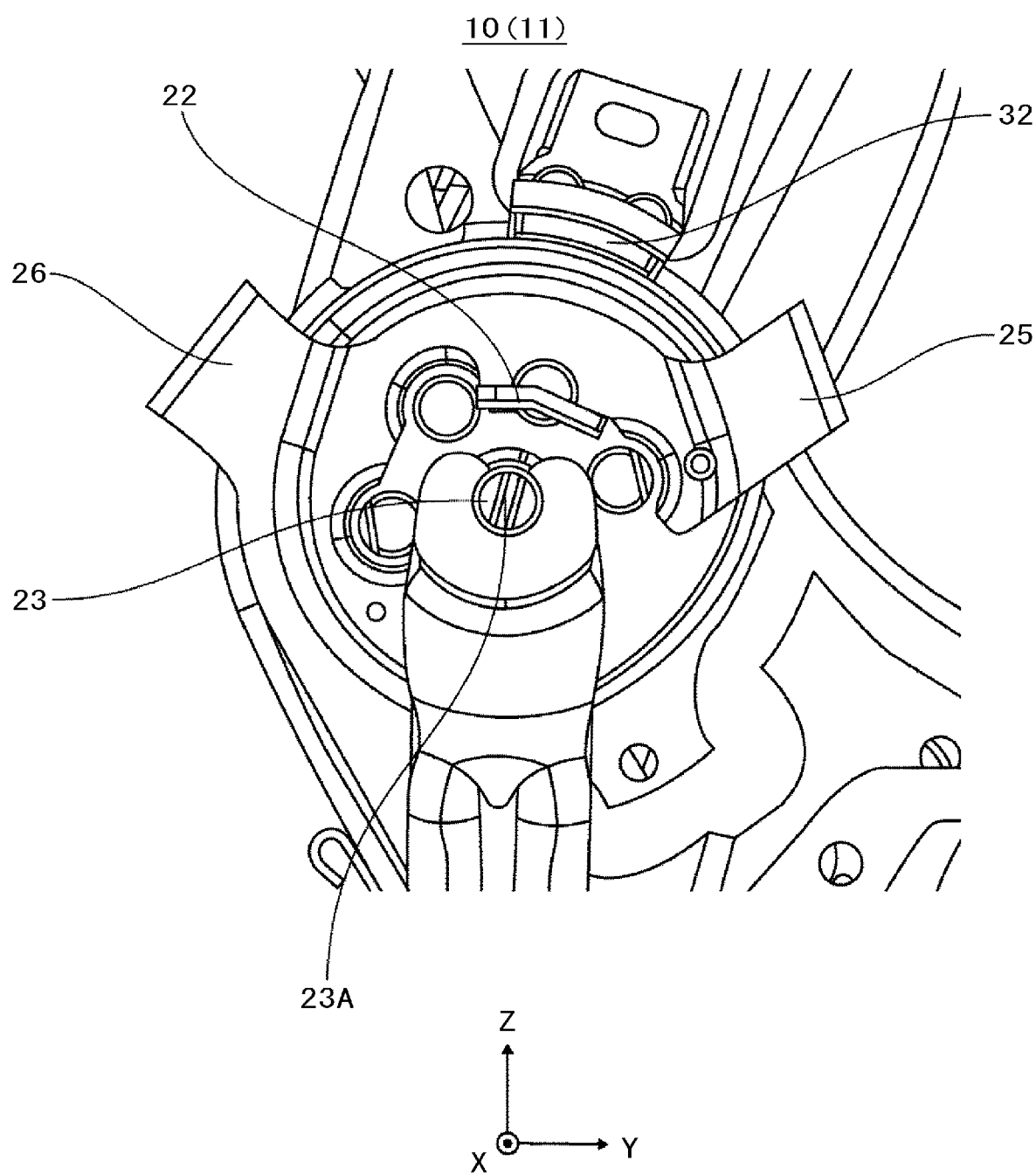
FIG. 4 is a side view of the principal part of the vehicle seat according to the embodiment.
Figure 5:
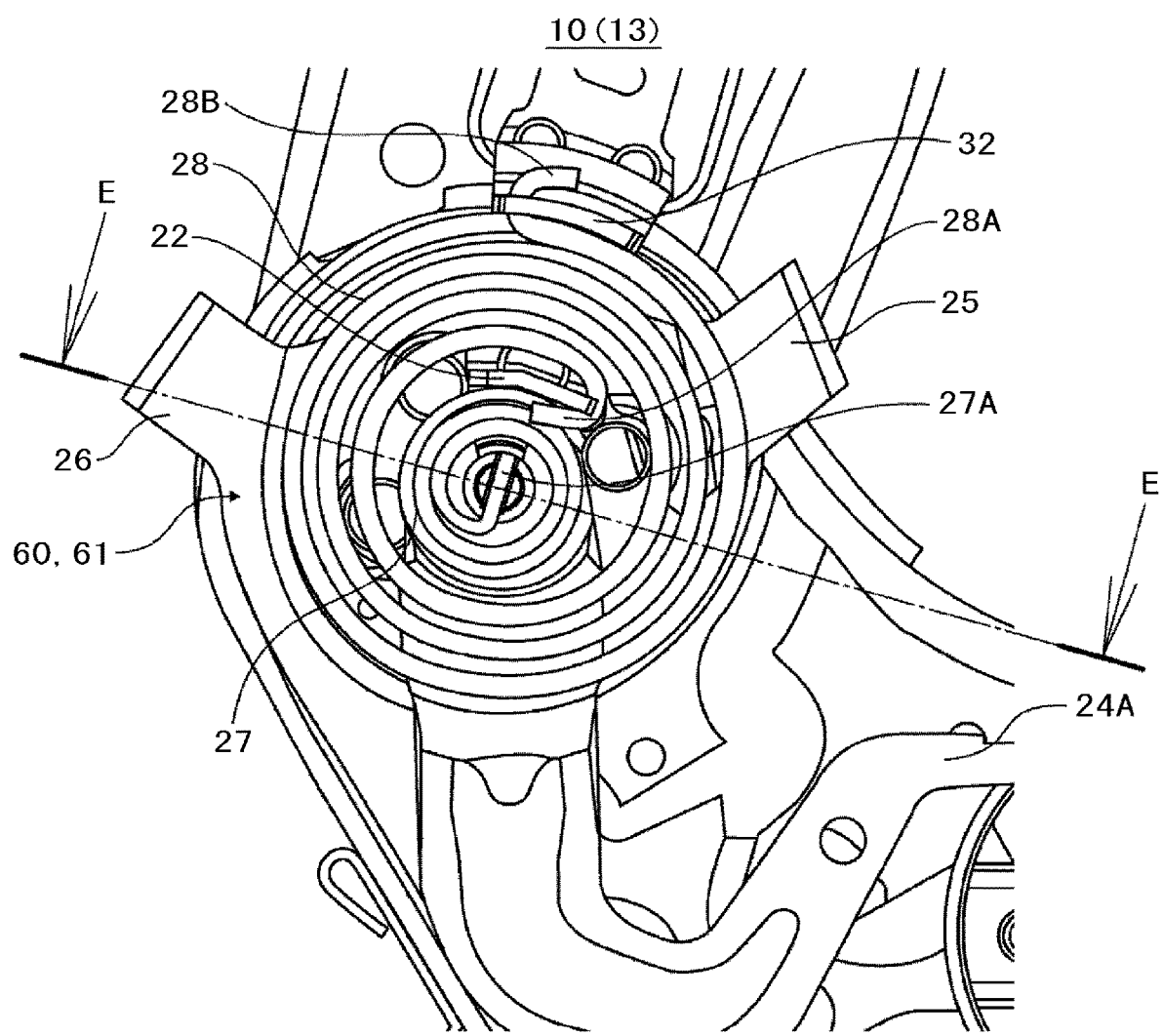
FIG. 5 is a side view of a principal part of the vehicle seat according to the embodiment.

FIG. 1 is a perspective view of the vehicle seat according to the embodiment. FIG. 2 is a perspective view of a principal part of the vehicle seat according to the embodiment. FIG. 3 is an enlarged view of FIG. 2. FIG. 4 is a side view of the principal part of the vehicle seat according to the embodiment. FIG. 5 is a side view of a principal part of the vehicle seat according to the embodiment.

As FIG. 1 shows, a vehicle seat 10 according to the embodiment includes a seat cushion 20 and a seatback 30. The seat cushion 20 includes side supports 50 at both sides. The seatback 30 includes a headrest 40 at its top part. The vehicle seat 10 includes a reclining device 60 to be described later, which allows the seatback 30 to be tiltably coupled to the seat cushion 20 so that rotating motion of the seatback 30 is regulatable, and the tilt angle thereof is arbitrarily adjustable and settable. The vehicle seat 10 is installed in the interior of the vehicle so that the +Y direction corresponds to the front side of the vehicle.

Referring to FIGS. 2 to 4, a seat frame 11 that constitutes the vehicle seat 10 includes a seat cushion frame 21 constituting the seat cushion 20 and a seatback frame 31 constituting the seatback 30. The seatback frame 31 includes a side frame 12A, and the seat cushion frame 21 includes a side frame 12B. The side frame 12B includes a hook piece 22, a shaft 23, a lever 24, and stoppers 25, 26. The hook piece 22 extends closer to the side frame 12B than the shaft 23. In other words, the length of the hook piece 22 from the side frame 12B in the X direction is longer than that of the shaft 23 from the side frame 12B in the X direction. The side frame 12A includes a hook piece 32. The lever 24 serves to unlock a lock device 61 of the reclining device 60, and has a base end fixed to the shaft 23. The shaft 23 is positioned at the center of rotating motion of the reclining device 60.

As FIG. 5 shows, at the base end of the lever 24, a return spring 27 constituted by the spiral spring is wound at the center, and an inner end 27A of the return spring 27 in the radial direction is locked in a groove 23A of the shaft 23 as a movable end. Although not shown in FIG. 5, an outer end 27B of the return spring 27 is locked in a recess 22A of the hook piece 22 fixed to the seat cushion frame 21 as a fixed end, for example. The return spring 27 applies urging force so as to bring the lock device 61 into the locked state. In other words, the return spring 27 urges an operation member 24A of the lever 24 so as to be directed upward (+Z direction) as shown in the drawing. Upon operation of the operation member 24A downward (−Z direction), the lock device 61 is unlocked. In the locked state of the lock device 61, the longitudinal direction of the groove 23A is tilted rightward with respect to the +Z direction. Accordingly, line E-E perpendicular to the longitudinal direction of the groove 23A is tilted with respect to the +Y direction.

As FIG. 5 shows, a return spring 28 constituted by the spiral spring is attached to the seat cushion frame 21 around the rotating center (outer side of the return spring 27). An inner end 28A of the return spring 28 in the radial direction is locked in a recess 22B of the hook piece 22 of the seat cushion frame 21 as the fixed end. The return spring 28 is the spiral spring which is thicker than the return spring 27. An outer end 28B of the return spring 28 is locked in a recess 32A of the hook piece 32 fixed to the seatback frame 31 as a movable end. The hook piece 32 is positioned above the hook piece 22, and a base end 32B of the hook piece 32 is fixed to the seatback frame 31. Therefore, in an off state resulting from unlocking of the lock device 61, the urging force toward the front tilting direction is applied to the seatback frame 31 from the return spring 28 via the hook piece 32. As a result, the seatback 30 becomes rotatable in the front tilting direction under the urging force of the return spring 28 as the regulation state of the reclining device 60 is released.

As FIG. 5 shows, the seat cushion frame 21 includes stoppers 25, 26 at the front and rear of the return spring 28 in the radial direction on its outer circumference. In the unlocked state, the seatback frame 31 may be tilted forward until the hook piece 32 fixed to the seatback frame 31 abuts on the front stopper 25, and tilted rearward until the hook piece 32 abuts on the rear stopper 26.

The vehicle seat 10 (seat frames 11, 13) according to the embodiment includes the hook piece 22, the lever 24, the stoppers 25, 26, and the hook piece 32 at the right side of the vehicle seat (+X direction side). However, they may be disposed at the left side of the vehicle seat (−X direction side) without being limited to the structure as described above.

<Manufacture Method>

A method for manufacture of vehicle seat according to the embodiment will be described referring to FIG. 6.

Figure 6:
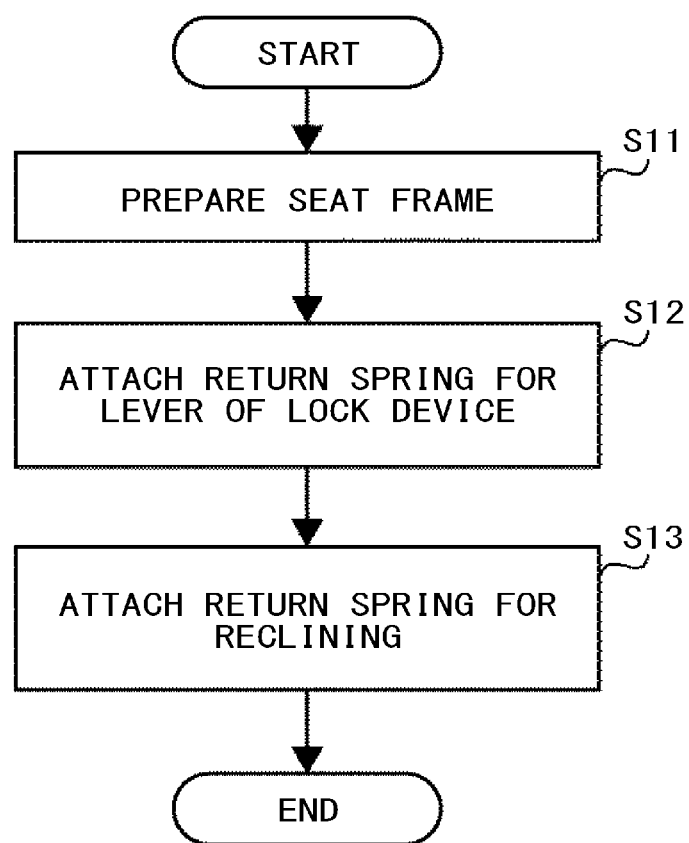
FIG. 6 is a flowchart explaining a method for manufacture of vehicle seat according to the embodiment.

FIG. 6 is a flowchart which represents the method for manufacture of vehicle seat according to the embodiment.

The process step for preparing the seat frame 11 (step S11) as shown in FIGS. 2 to 4 will be described first as below. (a) The seat cushion frame and the seatback frame each constituted by a pipe are assembled. (b) A headrest guide (headrest holder), a wire, and a bracket are attached to an upper pipe (not shown) of the seatback frame by welding. (c) A side tower (side frame) 12A is attached to the right side of the upper pipe (+X direction side) by welding. The side frame 12A is integrated with the side frame 12B to be attached to the seat cushion frame side. The side frame 12B is attached to the seat cushion frame side by welding. The hook piece 22 configured to hook the inner end 27A of the return spring 27, the shaft 23 configured to hook the outer end 27B of the return spring 27, and the lever 24 are attached to the side frame 12B. The hook piece 32 configured to hook the outer end 28B of the return spring 28 is attached to the side frame 12A. (d) The side frame is also attached to the left side (−X direction side) of the upper pipe by welding. The side frame is integrated with the one to be attached to the left side of the seat cushion frame. The side frame is attached to the left side of the seat cushion frame by welding. The hook piece 22 configured to hook the inner end 27A of the return spring 27, the shaft 23 configured to hook the outer end 27B of the return spring 27, and the lever 24 are not attached to the side frame at the left side of the seat cushion frame. The hook piece 32 configured to hook the outer end 28B of the return spring 28 is not attached to the side frame at the left side of the seatback. (e) A not shown slide rail and the cushion panel are attached to the seat cushion frame by welding so as to install a zigzag spring.

Then the return spring 27 for the lever 24 of the lock device 61 is attached to the seat frame 11 (seat cushion frame 21)(step S12).

Next, the return spring 28 for reclining is attached to the seat frame 11 (seat cushion frame 21)(step S13).

Assembly of the seat frame 13 as shown in FIG. 5 is completed.

The process step S12 will be described in detail referring to FIGS. 7A to 9.

Figure 7A:
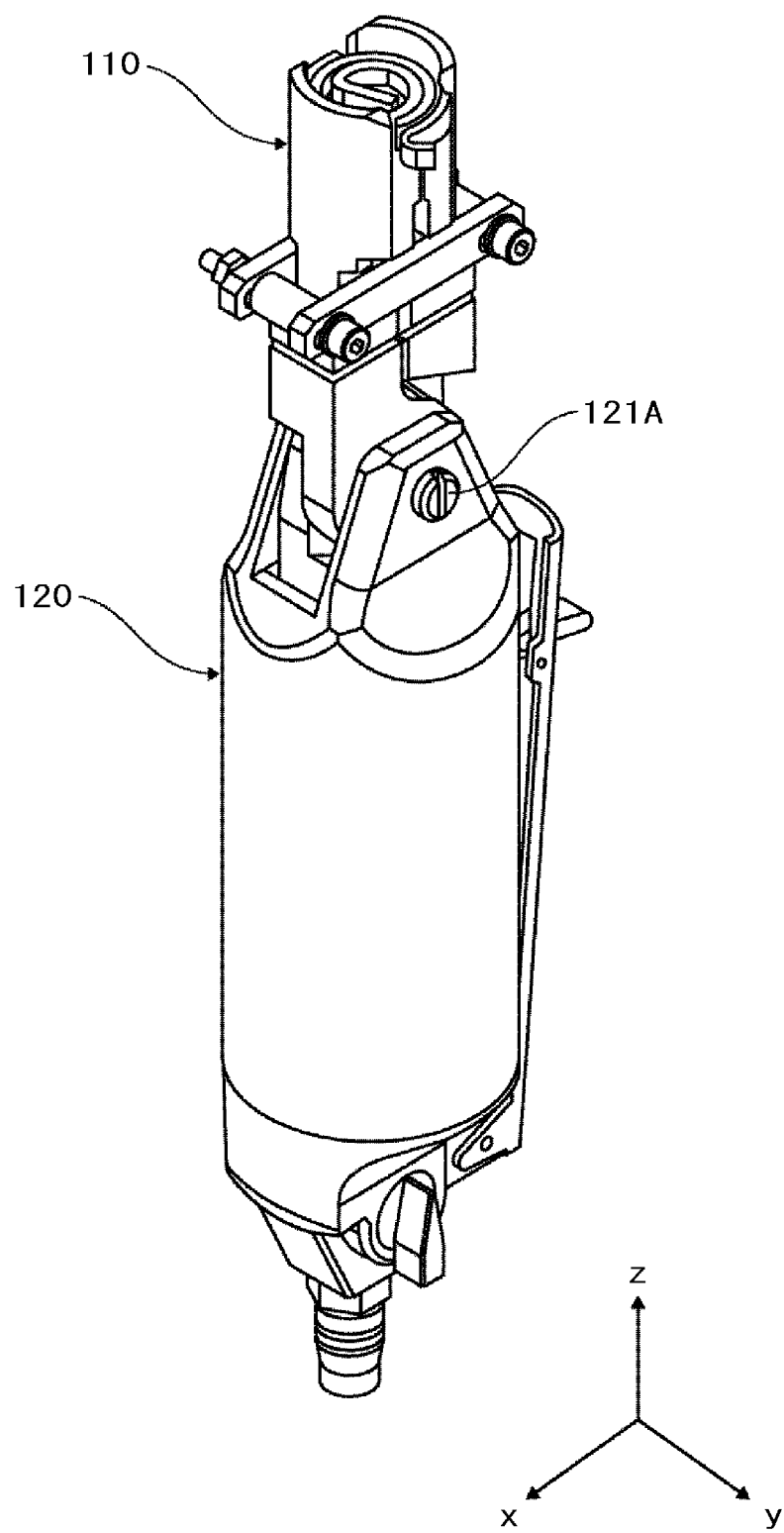
FIG. 7A is a perspective view of a clamp tool according to the embodiment.
Figure 7B:
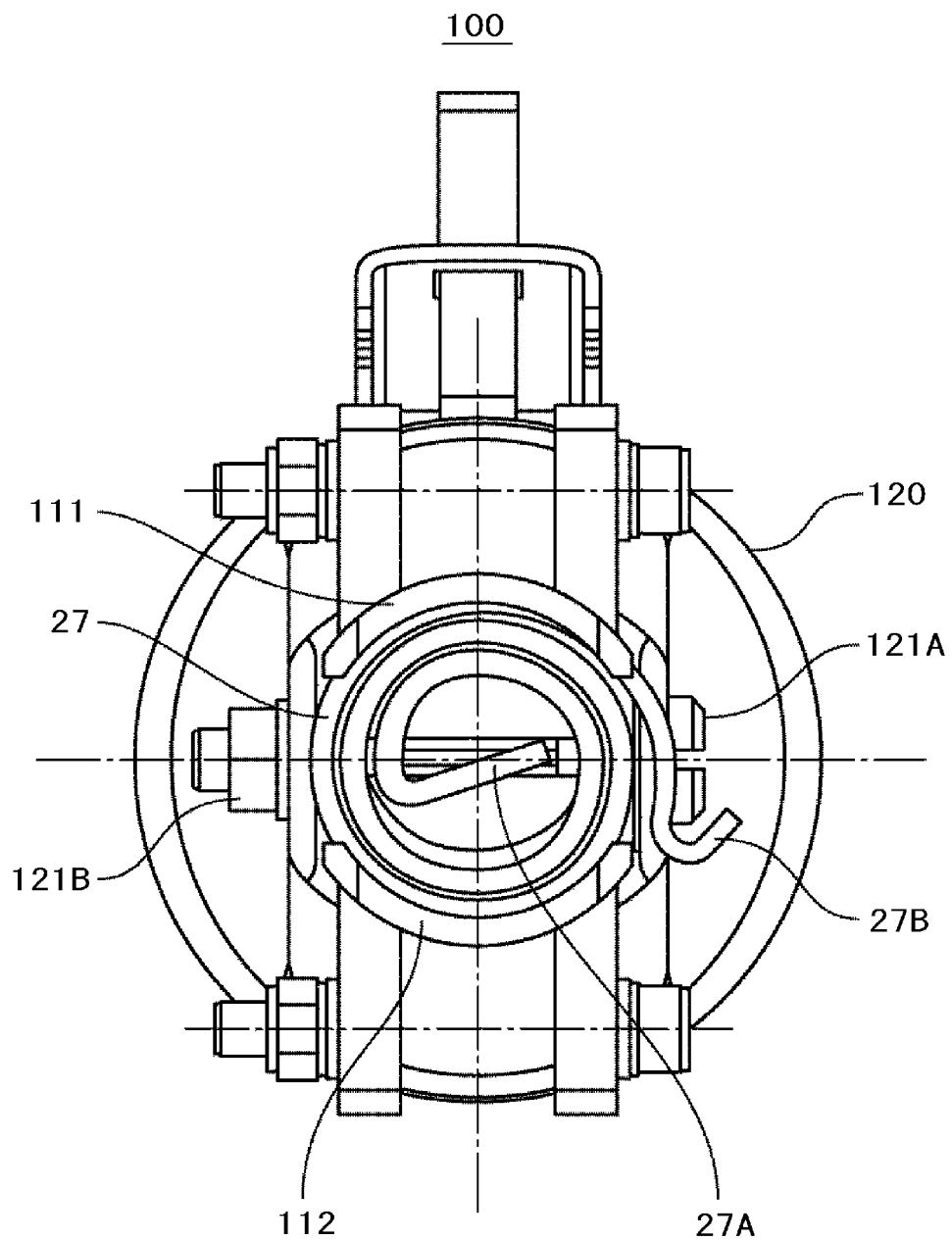
FIG. 7B is a top view of the clamp tool according to the embodiment.
Figure 7B:
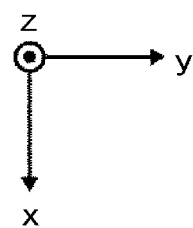
Figure 7C:
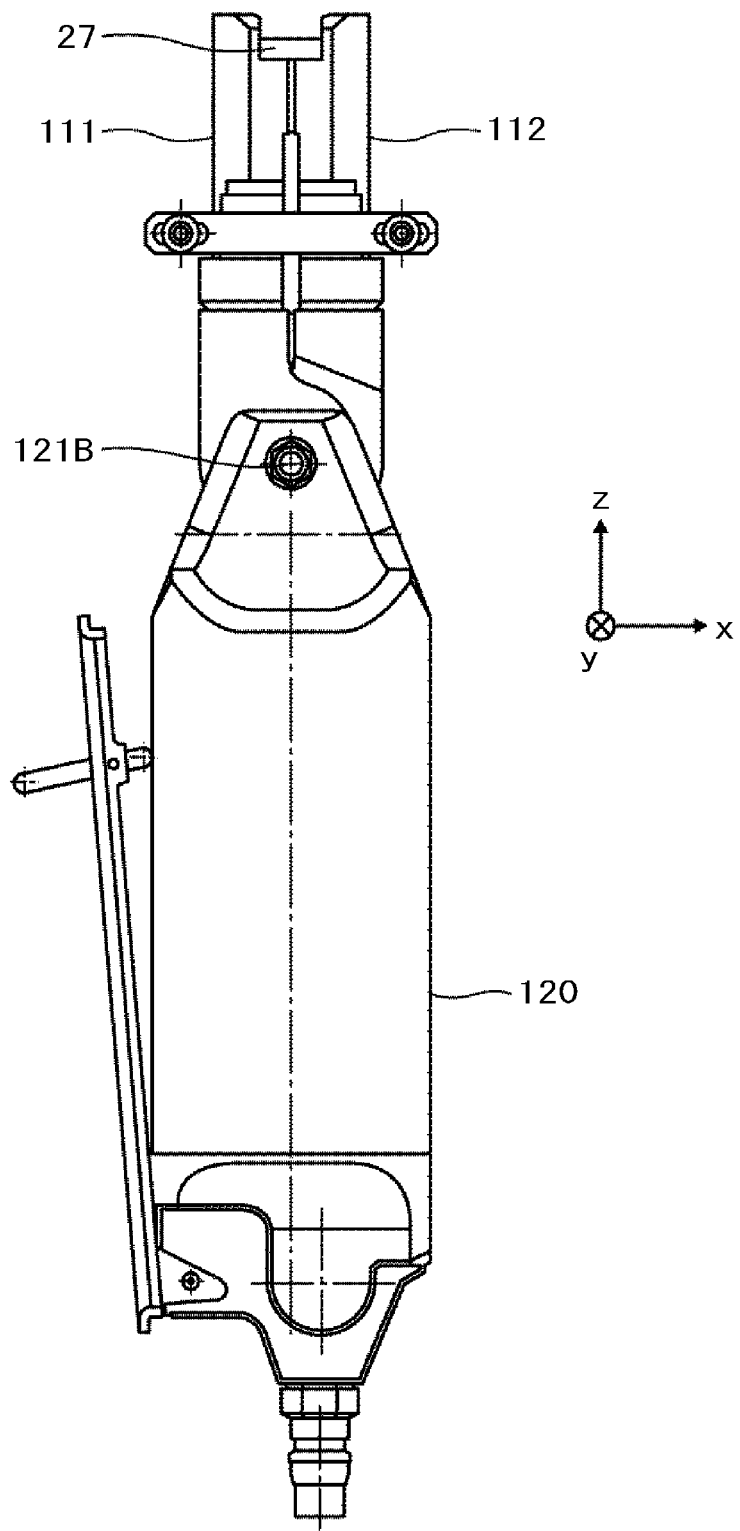
FIG. 7C is a front view of the clamp tool according to the embodiment.
Figure 7D:
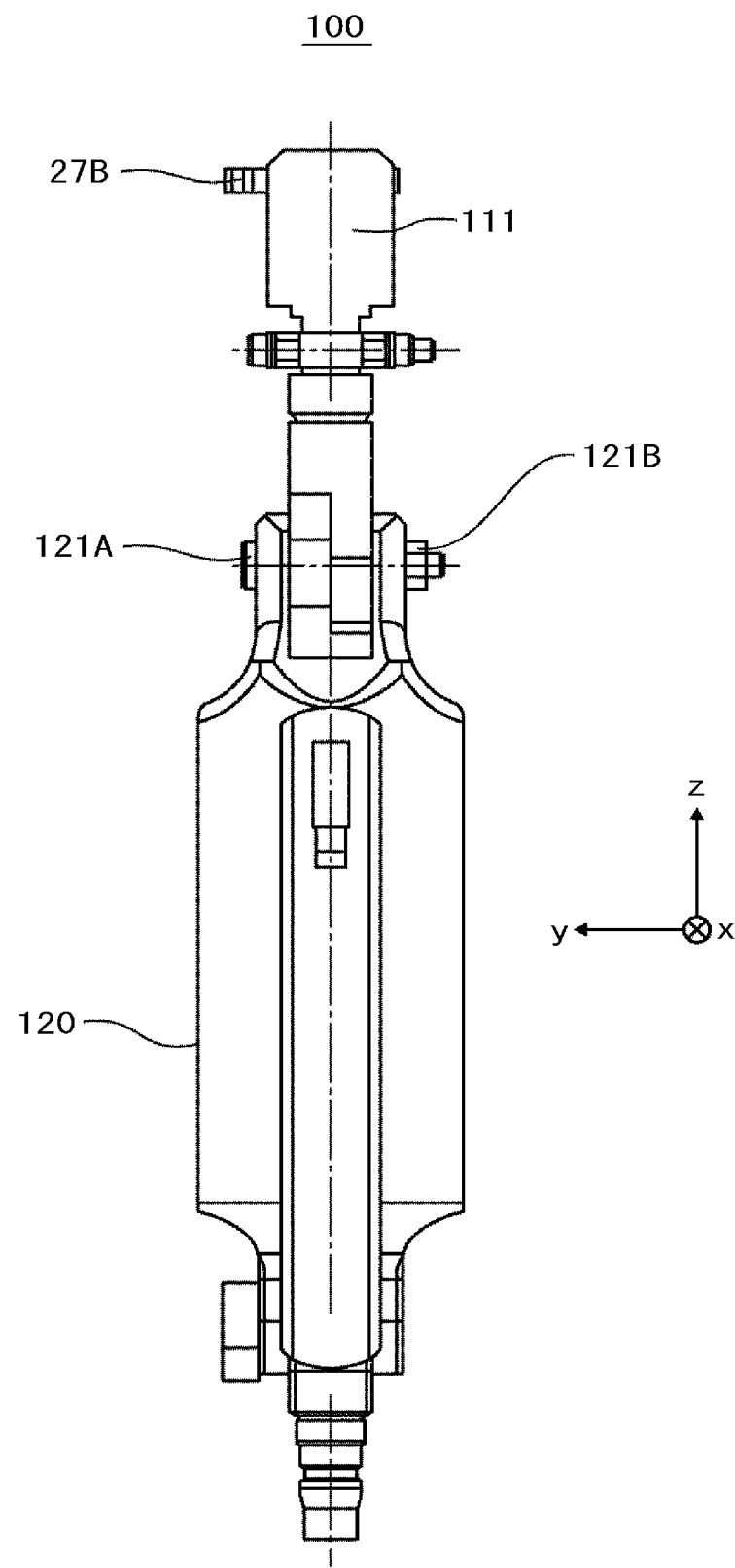
FIG. 7D is a side view of the clamp tool according to the embodiment.
Figure 8A:
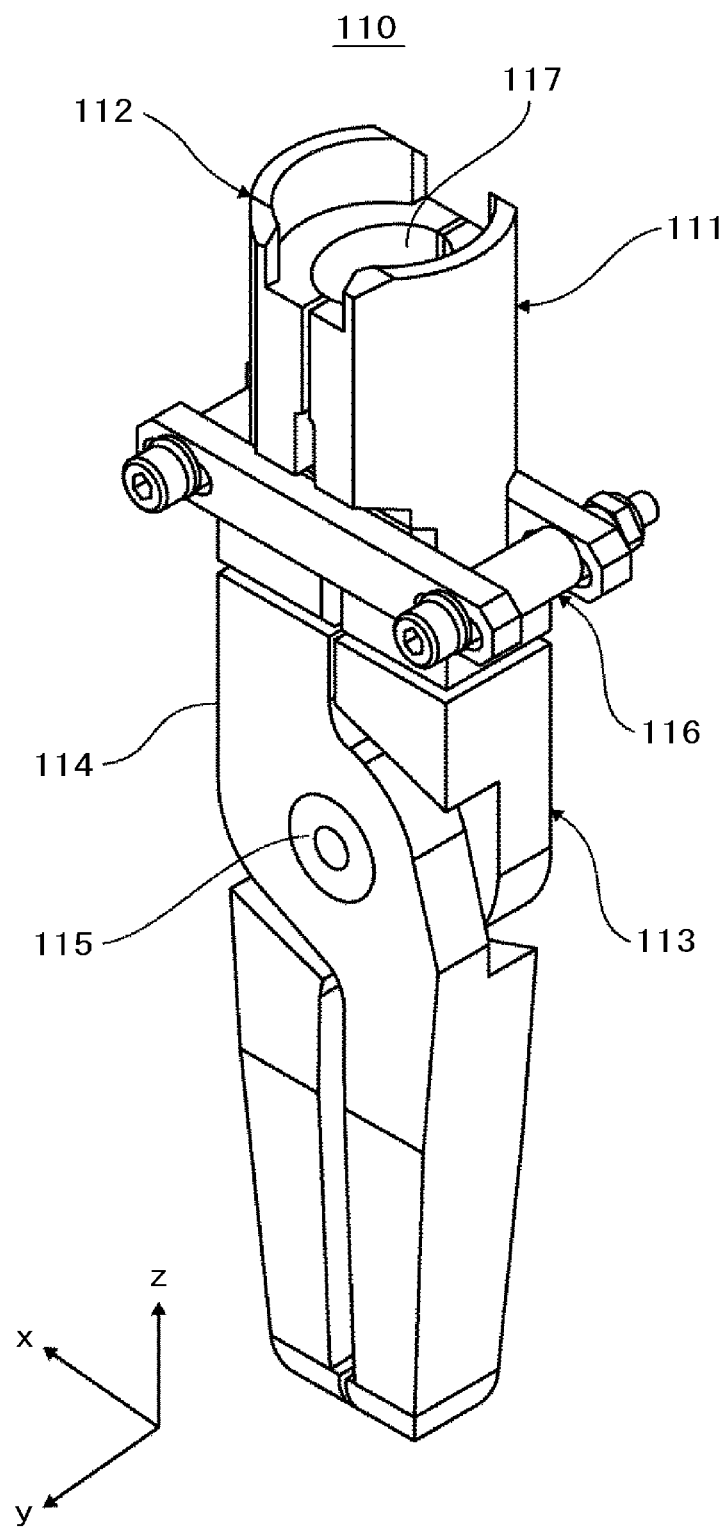
FIG. 8A is a perspective view of a clamp jig according to the embodiment.
Figure 8B:
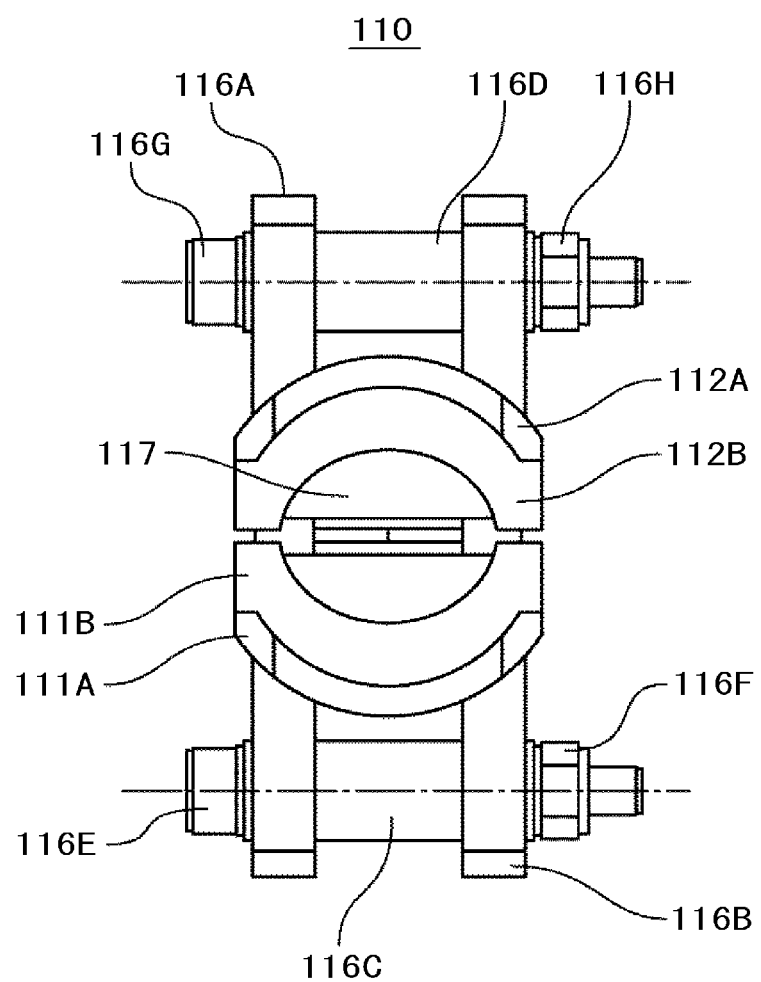
FIG. 8B is a top view of the clamp jig according to the embodiment.
Figure 8C:
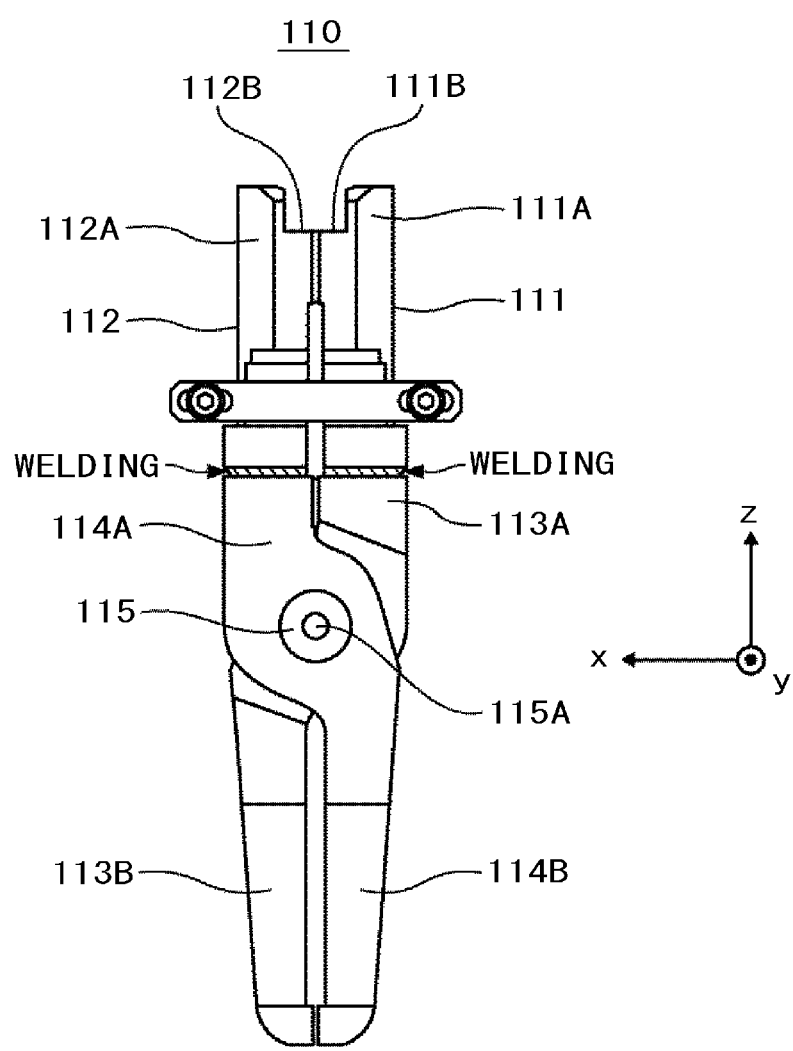
FIG. 8C is a front view of the clamp jig according to the embodiment.
Figure 8D:
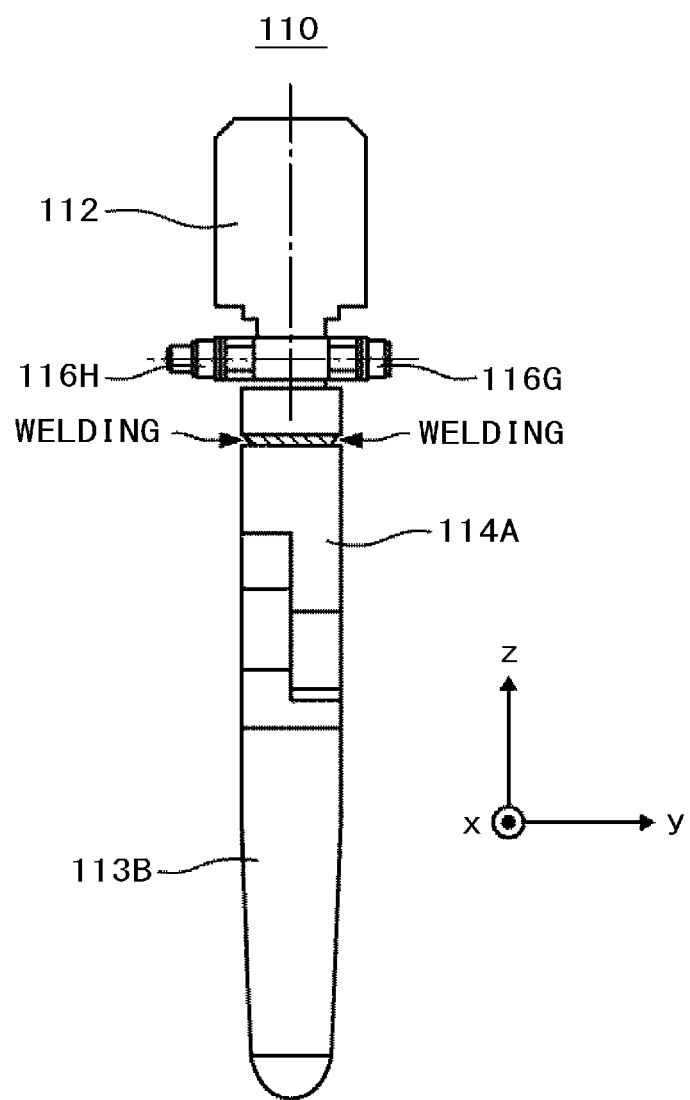
FIG. 8D is a side view of the clamp jig according to the embodiment.

FIG. 7A is a perspective view of a clamp tool according to the embodiment. FIG. 7B is a top view of the clamp tool according to the embodiment. FIG. 7C is a front view of the clamp tool according to the embodiment. FIG. 7D is a side view of the clamp tool according to the embodiment. FIG. 8A is a perspective view of a clamp jig according to the embodiment. FIG. 8B is a top view of the clamp jig according to the embodiment. FIG. 8C is a front view of the clamp jig according to the embodiment. FIG. 8D is a side view of the clamp jig according to the embodiment. FIG. 9 is a flowchart explaining a method for attachment of a return spring of the vehicle seat according to the embodiment.

A clamp tool 100 as the manufacturing device according to the embodiment will be described. The clamp tool 100 is configured by attaching a clamp jig 110 to an air clamp (force application device) 120 with fasteners 121A, 122B. A commercial product is available for the air clamp 120. The clamp jig 110 is produced adapted to the vehicle seat to be manufactured. It is preferable to produce the clamp jig so as to be shared by different types of vehicle seat. FIGS. 7A to 7D show the state that the return spring 27 is clamped.

The clamp jig 110 includes holding members 111, 112 for holding the return spring 27, and operation members 113, 114 for opening and closing the holding members 111, 112, respectively. The operation members 113 and 114 are connected by a connection member 115. The operation member 113 includes a section 113A connected to the holding member 111, and a section 113B to which force is applied from the air clamp 120. The operation member 114 includes a section 114A connected to the holding member 112, and a section 114B to which force is applied from the air clamp 120. The operation members 113 and 114 are connected by the connection member 115 so that the holding members 111, 112 are opened and closed while having the connection member 115 serving as a support point, and having the sections 113B of the operation member 113, and 114B of the operation member 114 serving as action points. Outside the holding members 111, 112, a limiting member 116 which limits each movable range thereof is disposed. A hole 115A is formed in the center of the connection member 115 so as to be used for fixing the clamp jig 110 to the air clamp 120. The limiting member 116 includes parts (cylindrical spacers) 116C, 116D which are brought into contact when the holding members 111, 112 are opened, parts 116A, 116B for connecting the parts 116C, 116D, fasteners (bolt 116E, nut 116F) for fixing the parts 116A, 116C, 116B, and fasteners (bolt 116G, nut 116H) for fixing the parts 116A, 116D, 116B. Each hole of the parts 116A, 116B is foiled so as to allow the bolts 116E, 116G to move in the x direction. It is therefore possible to change each movable range of the holding members 111, 112.

It is preferable to use S45C as the carbon steel material for mechanical structure for forming the holding members 111, 112. The respective components of the S45C are, for example, C: 0.42-0.48%, Si: 0.15-0.35%, Mn: 0.60-0.90%, P: 0.030% or less, and S: 0.035% or less. The holding members 111, 112 each made of green material will be deformed owing to repetitive operation performed approximately 10 times, requiring repair of tool on each occasion. However, the use of the carbon steel material for mechanical structure is free from the aforementioned problem. The holding members 111, 112 are fixed to the operation members 113A, 114A by welding. The holding members 111, 112 include sections 111A, 112A in contact with the outer circumference of the spiral portion of the return spring 27, and sections 111B, 112B in contact with the spiral surface of the return spring 27. In the state that the return spring 27 is held, a columnar space 117 is defined by the holding members 111 and 112 while having the size sufficient to allow insertion of the shaft 23. This allows the clamp tool 100 (clamp jig 110) to be pressed along the shaft 23. The outer end 27B of the return spring 27 is located so as to be locked in the recess 22A of the hook piece 22, and the inner end 27A of the return spring 27 is located so as to be locked in the recess 23A of the shaft 23. As the outer end 27B of the return spring 27 is positioned outside the holding members 111, 112, the return spring 27 may be visually recognized during attachment of the return spring 27 to the seat frame 11.

The air clamp 120 is allowed to apply force to the operation members 113B, 114B. The force application device is not limited to the air clamp, but may be the vise such as a C-clamp.

Next, the method for attachment of the return spring by using the clamp tool 100 (attachment method according to the embodiment) will be described. (a) The seat frame 11 as shown in FIGS. 2 to 4 is prepared. (b) The clamp tool 100 formed by attaching the clamp jig 110 to the air clamp 120 as shown in FIG. 7A is prepared. (c) The return spring 27 is set in the clamp jig 110 in the predetermined direction (step S121). The return spring 27 is oriented with respect to the clamp jig 110 in the predetermined range so that the outer end 27B and the inner end 27A of the return spring 27 are aligned with the recess 22A of the hook piece 22, and the groove 23A of the shaft 23, respectively. In order to manufacture the seat frame 12 as shown in FIG. 5, the return spring 27 as shown in FIGS. 7A to 7D has to be set inside out. (d) The return spring 27 is clamped and fixed with the clamp jig 110 (Step S122). The air clamp 120 applies force to the operation members 113B, 114B so that the return spring 27 is clamped by the holding members 111, 112. As force is applied from the air clamp without requiring the operator's force, the resultant workability is improved. (e) The return spring 27 clamped with the clamp jig is inserted into the recess 22A of the hook piece 22 and the groove 23A of the shaft 23 (step S123). The clamp tool 100 (clamp jig 110) is disposed so that the Y direction as shown in FIG. 5 is substantially in parallel to the x-direction as shown in FIGS. 7A to 7D. (e1) The clamp tool 100 is pushed toward the −X direction so that the outer end 27B of the return spring 27 is hooked in the recess 22B of the hook piece 22 at the near side. (e2) Then the clamp tool 100 is turned slightly leftward so that the inner end 27A of the return spring 27 is pressed into the groove 23A of the shaft 23. (e3) Finally, the clamp tool 100 is turned slightly rightward to press the outer end 27B of the return spring 27 so as to be hooked in the recess 22A of the hook piece 22 at the far side. In step (c) as described above, the direction of the return spring 27 is aligned, and in step (d), the return spring 27 is fixed. Accordingly, when the inner end 27A of the return spring 27 reaches the position so as to be engaged with the groove 23A of the shaft 23, the clamp tool 100 (clamp jig 110) may be pressed along the shaft 23. It is only required to press the clamp tool 100 (clamp jig 110) into the section where the return spring 27 is inserted, resulting in improved workability. (f) The return spring 27 is disengaged from the clamp jig 110 (step S124). The force application from the air clamp 120 to the operation members 113B, 114B is stopped so that the return spring 27 is disengaged from the holding members 111, 112. As the force is released by the air clamp, the operator's force is not required, resulting in good workability.

The method for attachment of the return spring without using the clamp tool 100 will be described (attachment method according to the comparative example).

(e1') The outer end 27B of the return spring 27 is hooked in the recess 22B of the hook piece 22 at the near side for holding with the finger. (e2') Then the inner end 27A of the return spring 27 is pressed into the groove 23A of the shaft 23 with a first exclusive tool while holding the outer end 27B with the finger. (e3') Finally, the outer end 27B of the return spring 27 is disengaged from the recess 22B of the hook piece 22 at the near side so as to be hooked in the recess 22A at the far side.

Since the attachment method according to the comparative example does not employ the clamp tool 100, there are no process steps corresponding to those from (b) to (d), and (f), but steps corresponding to those from (e1) to (e3) are executed in the process steps from (e1') to (e3').

Meanwhile, as the attachment method according to the embodiment employs the clamp tool 100, holding and moving of the return spring may be executed concurrently. Therefore, the process steps from (e1) to (e3) may be implemented only by slightly moving the clamp jig 100.

Therefore, the attachment method according to the embodiment provides better workability than that of the attachment method according to the comparative example.

The present invention made by the inventor has been described in detail based on the embodiment. It is to be understood that the present invention is not limited to the above-described embodiment, but may be arbitrarily modified.

REFERENCE SIGNS LIST

10: vehicle seat,
11: seat frame,
12A: side frame,
12B: side frame,

13: seat frame,
20: seat cushion,
21: seat cushion frame,
22: hook piece,
22A: recess,
22B: recess,
23: shaft,
23A: groove,
24: lever,
24A: operation member,
25: stopper,
26: stopper,
27: return spring,
27A: inner end,
27B: outer end,
28: return spring,
28A: inner end,
28B: outer end,
30: seatback,
31: seatback frame,
32: hook piece,
32A: recess,
32B: base end,
40: headrest,
50: side support,
60: reclining device,
61: lock device,
100: clamp tool,
110: clamp jig,
111: holding member,
112: holding member,
113: operation member,
114: operation member,
115: connection member,
116: limiting member,
117: space,
120: air clamp (force application device)

The invention claimed is:

1. A device for manufacture of a vehicle seat, comprising:
a clamp jig; and
a force application device for applying force to the clamp jig, wherein:
the clamp jig includes a first holding member, a second holding member, and an operation member for opening and closing the first and the second holding members;
the force application device applies force to the operation member so that the first and the second holding members are closed to clamp a return spring;
the force application device applies no force to the operation member so that the first and the second holding members are opened to disengage the return spring from the first and the second holding members;
the force application device is an air clamp;
each top end of the first and the second holding members includes a recess for fixing the return spring; and
in a state that the return spring is clamped and fixed with the first and the second holding members, a columnar space is defined by the first and the second holding members.

2. The device for manufacture of a vehicle seat according to claim 1, wherein the return spring is of spiral type, having an outer end bent so as to be hooked on a hook piece attached to a seat cushion frame, and having the outer end disposed at an outer side of the first and the second holding members.

3. The device for manufacture of a vehicle seat according to claim 1, wherein each of the first and the second holding members is made of a carbon steel material for mechanical structure.

4. The device for manufacture of a vehicle seat according to claim 3, wherein the carbon steel material for mechanical structure is S45C.

* * * * *